(12) United States Patent
Farrugia

(10) Patent No.: US 8,053,532 B2
(45) Date of Patent: Nov. 8, 2011

(54) POLYESTER TONER COMPOSITIONS

(75) Inventor: Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/779,678

(22) Filed: May 13, 2010

(65) Prior Publication Data

US 2010/0222521 A1    Sep. 2, 2010

Related U.S. Application Data

(62) Division of application No. 11/614,114, filed on Dec. 21, 2006, now Pat. No. 7,749,672.

(51) Int. Cl.
*C08F 8/18* (2006.01)

(52) U.S. Cl. ............... 525/355; 525/383; 430/109.1; 430/109.4

(58) Field of Classification Search .......... 525/355, 525/383; 430/109.1, 109.4
See application file for complete search history.

(56) References Cited

U.S. PATENT DOCUMENTS

| | | | |
|---|---|---|---|
| 3,837,798 A | | 9/1974 | Yelin et al. |
| 4,254,207 A | | 3/1981 | Landoll et al. |
| 4,298,672 A | | 11/1981 | Lu |
| 4,338,390 A | | 7/1982 | Lu |
| 4,990,424 A | | 2/1991 | Van Dusen et al. |
| 5,166,026 A | | 11/1992 | Fuller et al. |
| 5,290,654 A | | 3/1994 | Sacripante et al. |
| 5,302,486 A | | 4/1994 | Patel et al. |
| 5,593,807 A | | 1/1997 | Sacripante et al. |
| 5,686,218 A | * | 11/1997 | Liebermann et al. ...... 430/109.4 |
| 5,691,095 A | | 11/1997 | Shinzo et al. |
| 5,783,729 A | * | 7/1998 | Brown et al. ............... 562/409 |
| 2003/0232268 A1 | | 12/2003 | Sacripante et al. |
| 2004/0191658 A1 | | 9/2004 | Kubo |
| 2004/0209182 A1 | | 10/2004 | Kawase |
| 2005/0047961 A1 | * | 3/2005 | Bains et al. .................. 422/37 |
| 2005/0164112 A1 | | 7/2005 | Ohki et al. |
| 2006/0063086 A1 | | 3/2006 | Sacripante et al. |
| 2008/0107990 A1 | | 5/2008 | Field et al. |

FOREIGN PATENT DOCUMENTS

| | | |
|---|---|---|
| EP | 1 862 864 A1 | 12/2007 |
| EP | 1 890 194 A1 | 2/2008 |
| EP | 1 918 781 A1 | 5/2008 |
| EP | 1 925 983 A2 | 5/2008 |
| EP | 1 995 639 A1 | 11/2008 |
| EP | 2 012 185 A1 | 1/2009 |
| EP | 2 083 034 A1 | 7/2009 |
| GB | 1 525 704 | 9/1978 |
| JP | A 2004-287422 | 10/2004 |
| JP | A 2004-287427 | 10/2004 |
| JP | A 2004-295110 | 10/2004 |
| JP | A 2005-17991 | 1/2005 |

OTHER PUBLICATIONS

European Search Report in European Patent Application No. EP 07 12 2594, mailed Feb. 29, 2008.
U.S. Office Action in U.S. Appl. No. 11/614,114, mailed Sep. 30, 2009.
European Official Communication dated Oct. 20, 2009.

\* cited by examiner

*Primary Examiner* — Ling-Siu Choi
(74) *Attorney, Agent, or Firm* — Oliff & Berridge, PLC

(57) ABSTRACT

An emulsion aggregation polyester toner including a polyester resin having modified end groups, wherein the polyester resin includes at least one carboxylic end group. A process of making the toner by oxidation of a polyester resin including reacting the polyester with a hypohalite and a phase transfer catalyst results in a polyester resin endcapped with at least one acidic group. Stable xerographic charging in all ambient environments for all colors, and excellent resistivity and cohesion of the toner, may be achieved.

15 Claims, No Drawings

POLYESTER TONER COMPOSITIONS

CROSS-REFERENCE TO RELATED APPLICATION

This is a Division of application Ser. No. 11/614,114 filed Dec. 21, 2006, now U.S. Pat. No. 7,749,672. The disclosure of the prior application is hereby incorporated by reference herein in its entirety.

BACKGROUND

The present disclosure generally relates to toners and their use in methods for forming and developing images of good quality, and in particular to emulsion aggregation toners containing a polyester resin with carboxylic end groups. The disclosure also relates to methods of oxidizing polyester hydroxyl end groups to increase acidic moieties in the resin.

REFERENCES

Xerographic toners of a resin, a pigment, and a charge control agent are known. Toners useful for xerographic applications should exhibit certain performances related to storage stability, and particle-size integrity; that is, the toner particles should remain intact and not agglomerate until fused on paper. The toner compositions also should not substantially agglomerate at temperatures below about 50° C. to about 55° C., because environmental conditions vary. The toner compositions should also display acceptable triboelectric properties that vary with the type of carrier or developer composition.

Low-temperature-fixing toners comprised of semi-crystalline resins are known. For example, U.S. Pat. No. 5,166,026 discloses semi-crystalline copolymer resin toners, with melting points of from about 30° C. to about 100° C., and containing functional groups comprising hydroxy, carboxy, amino, amido, ammonium or halo, and pigment particles.

Crystalline-based toners are disclosed, for example, in U.S. Pat. No. 4,254,207. Low-temperature-fixing toners comprised of cross-linked crystalline resin and amorphous polyester resin are illustrated in U.S. Pat. No. 4,990,424, in which the toner powder is comprised, for example, of polymer particles of partially carboxylated crystalline polyester and partially carboxylated amorphous polyester that has been cross-linked together at elevated temperature with the aid of an epoxy resin and a cross-linking catalyst.

Conventional low-melt toner compositions, such as those described above, generally comprise from about 10 to about 35% of an unsaturated crystalline resin and from about 90 to about 65% of a branched, amorphous polyester resin. Such toner compositions meet the crease, gloss, latitude, and charging performance requirements of high-speed production printing. These toners also meet heat-cohesion requirements when less than 10% additives are present. Such toners are prepared by conventional melt-extrusion techniques. However, the crystalline components of such toners are very ductile and are difficult to reduce to small particles, such as particles having an average particle diameter of about 7 microns, in sufficiently high yields.

U.S. Pat. No. 5,686,218 describes a toner comprised of a polyester obtained by a process which comprises reacting a polyester resin endcapped with hydroxyl moieties or groups with an organic acid anhydride at a temperature of from about 125° C. to about 200° C., thereby resulting in a polyester resin endcapped with acidic moieties or acid groups, and pigment.

What is still desired is a polyester resin emulsion aggregation toner that can achieve stable xerographic charging in all ambient environments for all colors, and excellent resistivity and cohesion. There is also a need to provide economical processes for preparing such toners that allow for controlled particle growth and controlled morphology or shape, and provide high yields of small particles.

SUMMARY

These and other improvements are accomplished by the toners described herein.

In embodiments, described is a process for making a toner, comprising oxidizing a polyester resin by reacting the polyester in an organic phase with a hypohalite in an aqueous phase, using a phase transfer catalyst, resulting in a polyester resin containing chains endcapped with at least one acidic group.

In embodiments, the toner is an emulsion aggregation toner comprised of a polyester resin, wherein the polyester resin includes chains endcapped with at least one acid group to provide a polyester resin with an acid value of 1 to 25 mg/eq. KOH, and wherein the acid value of the toner is substantially the same as the acid value of the polyester resin.

EMBODIMENTS

Toners useful for xerographic applications desirably possess certain properties related to storage stability and particle size integrity. That is, it is desired to have the particles remain intact and not agglomerate until they are fused on paper. Since environmental conditions vary, the toners also desirably do not have particles that substantially stick together up to a temperature of from about 50° C. to about 55° C.

The toner, comprised of at least resin and colorant, desirably also displays acceptable triboelectrification properties which vary with the type of carrier or developer composition.

The toner desirably also possesses low melting properties. That is, the toner may be a low melt or ultra low melt toner. Low melt toners display a melting point of from about 80° C. to about 130° C., such as from about 90° C. to about 120° C., while ultra low melt toners display a melting point of from about 50° C. to about 100° C., such as from about 50° C. to about 90° C. Thus, the polyester toners disclosed herein may display a melting point of from about 50° C. to about 130° C. or from about 50° C. to about 120° C.

Additionally, small sized toner particles, such as from about 3 to about 25 microns, and for example from about 3 to about 15 microns, are desired, especially in xerographic engines wherein high resolution is required. Toners with the aforementioned small sizes can be economically prepared by chemical processes, also known as direct or "in situ" toner process, such as the emulsion aggregation process, or by suspension, microsuspension or microencapsulation processes.

Disclosed herein are toners, and processes for making toners, that exhibit one or more of the above desirable properties. The polyester toners are derived from at least one polyester resin having at least one carboxylic acid end group.

Examples of polyester resins suitable for use herein include amorphous resins including both branched and linear amorphous resins, and combinations of branched and linear amorphous resins. Specific examples of amorphous resins suitable for use herein include polyester resins, polyimide resins, poly(styrene-acrylate) resins, poly(styrene-methacrylate) resins, poly(styrene-butadiene) resins, alkali sulfonated-polyester resins, alkali sulfonated-polyimide resins, alkali sulfonated poly(styrene-acrylate) resins, poly(styrene-methacrylate) resins, alkali sulfonated-poly(styrene-butadiene) resins, a polyester-imide, an alkali sulfonated polyamide, an alkali sulfonated polyester-imide, copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly (propoxylated bisphenol-A-fumarate)-copoly(propoxylated bisphenol-A-5-sulfo-isophthalate), copoly(ethoxylated bisphenol-A-fumarate)-copoly(ethoxylated bisphenol-A-5-sulfo-isophthalate), copoly(ethoxylated bisphenol-A-maleate)copoly(ethoxylated bisphenol-A-5-sulfo-isophthalate), branched resins of the foregoing, crosslinked resins of the foregoing, and mixtures/combinations thereof.

The amorphous resin may include crosslinked portions therein, for example such that the toner has a weight fraction of the microgel (a gel content) in the range of, for example, from about 0.001 to about 50 weight percent, such as from about 0.1 to about 40 weight percent or from about 1 to about 10 weight percent, of the amorphous polyester. The gel content may be achieved either by mixing in an amount of crosslinked material, or crosslinking portions of the amorphous polyester, for example by including a crosslinking initiator in the amorphous polyester. The initiators may be, for example, peroxides such as organic peroxides or azo-compounds, for example diacyl peroxides such as decanoyl peroxide, lauroyl peroxide and benzoyl peroxide, ketone peroxides such as cyclohexanone peroxide and methyl ethyl ketone, alkyl peroxy esters such as t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy)hexane, oo-t-butyl o-(2-ethyl hexyl)mono peroxy carbonate, and oo-t-amyl o-(2-ethyl hexyl)mono peroxy carbonate, alkyl peroxides such as dicumyl peroxide, 2,5-dimethyl 2,5-di(t-butyl peroxy)hexane, t-butyl cumyl peroxide, bis(t-butyl peroxy)diisopropyl benzene, di-t-butyl peroxide and 2,5-dimethyl 2,5-di(t-butyl peroxy)hexyne-3, alkyl hydroperoxides such as 2,5-dihydro peroxy 2,5-dimethyl hexane, cumene hydroperoxide, t-butyl hydroperoxide and t-amyl hydroperoxide, and alkyl peroxyketals such as n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate, azobis-isobutyronitrile, 2,2'-azobis(isobutyronitrile), 2,2'-azobis(2,4-dimethyl valeronitrile), 2,2'-azobis(methyl butyronitrile), 1,1'-azobis(cyano cyclohexane), 1,1-di(t-butyl peroxy)-3,3,5-trimethylcyclohexane, combinations thereof and the like. The amount of initiator used is proportional to the degree of crosslinking, and thus the gel content of the polyester material. The amount of initiator used may range from, for example, about 0.01 to about 10 weight percent, such as from about 0.1 to about 5 weight percent or the amorphous polyester. In the crosslinking, it is desirable that substantially all of the initiator be used up. The crosslinking may be carried out at high temperature, and thus the reaction may be very fast, for example, less than 10 minutes, such as from about 20 seconds to about 2 minutes residence time.

Branched amorphous polyester resins are generally prepared by the polycondensation of an organic diol, a diacid or a diester, a sulfonated difunctional monomer, and a multivalent polyacid or polyol as the branching agent and a polycondensation catalyst. The sulfonated difunctional monomer may optionally be an alkali sulfonated difunctional monomer.

Examples of diacid or diesters selected for the preparation of amorphous polyesters and crystalline polyester include dicarboxylic acids or diesters such as terephthalic acid, phthalic acid, isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. Further examples of organic diacids or diesters suitable for use herein include oxalic acid, sebacic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid or diester are selected, for example, from about 25 to about 75 mole percent of the resin, such as from about 40 to about 60 or from about 45 to about 52 mole percent of the resin.

Examples of diols utilized in generating the amorphous polyester and the crystalline polyester may include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hyroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and mixtures thereof. Examples of organic diols may further include aliphatic diols with from about 2 to about 36 carbon atoms, such as 1,2-ethanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The amount of organic diol selected can vary, and may be from about 25 to about 75 mole percent of the resin, such as from about 40 to about 60 or from about 45 to about 52 mole percent of the resin.

Alkali sulfonated difunctional monomer examples, wherein the alkali is lithium, sodium, potassium, or the like, include dimethyl-5-sulfo-isophthalate, dialkyl-5-sulfoisophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfoterephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpentanediol, sulfo-p-hydroxybenzoic acid, mixtures thereof, and the like. Effective difunctional monomer amounts of, for example, from about 0.01 to about 10 weight percent of the resin, such as from about 0.05 to about 5 weight percent or from about 0.1 to about 2 weight percent of the resin can be selected.

Branching agents to generate a branched amorphous polyester resin include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.01 to about 10 mole percent of the resin, such as from about 0.05 to about 8 mole percent or from about 0.1 to about 5 mole percent of the resin.

The amorphous resin is, for example, present in an amount from about 50 to about 90 percent by weight, such as from about 65 to about 85 percent by weight, of the binder. In embodiments, the amorphous resin possesses, for example, a number average molecular weight (Mn), as measured by gel permeation chromatography (GPC), of from about 5,000 to about 500,000, such as from about 10,000 to about 250,000; a weight average molecular weight (Mw) of, for example, from about 7,000 to about 600,000, such as from about 20,000 to about 300,000, as determined by GPC using polystyrene standards; and wherein the molecular weight distribution (Mw/Mn) is, for example, from about 1.5 to about 6, such as from about 2 to about 4.

The crystalline resin may be, for example, a polyester, a polyamide, a polyimide, a polyethylene, a polypropylene, a polybutylene, a polyisobutyrate, an ethylene-propylene copolymer, or an ethylene-vinyl acetate copolymer or a polyolefin.

Examples of crystalline resins that are suitable for use herein include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), poly(octylene-adipate), or combinations thereof.

The crystalline resin in the toner may display or possess a melting temperature of, for example, from about 60° C. to about 85° C., and a recrystallization temperature of at least about 47° C., such as a recrystallization temperature of, for example, from about 50° C. to about 65° C. In embodiments, the crystalline resin is a sulfonated polyester resin. The crystalline resin may be sulfonated from about 0.5 weight percent to about 4.5 weight percent, such as from about 1.5 weight percent to about 4.0 weight percent.

If semicrystalline polyester resins are used herein, the semicrystalline resin includes, for example, poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly (tetramethylene trithiodicarboxylate), poly(trimethylene dodecane dioate), poly(m-xylene), poly(p-xylylene pimelamide), and combination thereof. The semicrystalline resins possess, for example, a suitable weight average molecular weight Mw of from about 7,000 to about 200,000, such as from about 10,000 to about 150,000, and a number average molecular weight Mn of, for example, from about 1,000 to about 60,000, such as from about 3,000 to about 50,000.

Although it is not known with certainty, it is believed that ionic moieties of both crystalline and amorphous resins, such as sulfate ions, provide charge necessary for formation of the toners in a chemical process such as emulsion aggregation, as well as machine performance of the toner. However, while sulfonate groups provide charge, they are also quite hydrophilic and tend to absorb too much water in higher humidity conditions, such as 85% relative humidity (RH). Charge conduction is thus hindered under high relative humidity conditions due to water absorption. It is thus believed that reducing or eliminating the number of sulfonated groups in toner resins will improve charge conduction under high humidity conditions.

The presence of carboxylic acid moieties at the end of a polyester resin assists in increasing the charge of the toner, and allows toner particles containing such polyester resins to be prepared by chemical processes, such as emulsion-aggregation processes. In particular, carboxylic acid end groups can act as ionic groups to provide charge for the toner particles and toner compositions, permitting removal of sulfonate groups. The carboxylic acid group may also stabilize toner particles, because it is known to be difficult to prepare toner particles from resins having low amounts of carboxylic acid groups and little or no sulfonation. Incorporating carboxylic acid groups at the ends of the polymer chains also allows improved flow or cohesion, even under conditions of high humidity.

Polyester toners prepared by a polycondensation process, which involves the use of excess glycol monomer, may result in polyester chains with hydroxyl rather than carboxylic acid end groups. For some polyester resins, for example ones with low or no sulfonated resin, there is a need for ionic groups that will provide charge for the toner. In embodiments, the hydroxyl end groups of the polyester resin may be modified to carboxylic acid end groups to provide the needed charge.

In embodiments, the hydroxyl-terminated polyester resin is first prepared by polycondensation. In particular, suitable organic diols are reacted with suitable organic diacids or diesters in the presence of a polycondensation catalyst. Generally, equimolar amounts of the organic diol and the organic diacid or diester are used in the reaction. However, when the boiling point of the organic diol is in a range of from about 180° C. to about 230° C., an excess amount of diol may be used and removed during the polycondensation process, followed by the addition of the polyacrylic acid at a temperature from about 160° C. to about 200° C. When organic diesters are used in place of organic diacids, an alcohol byproduct is generated.

The amount of polycondensation catalyst utilized varies, and may be selected in an amount, for example, of from about 0.01 to about 1 mole percent of the resin. Additionally, in place of an organic diacid, an organic diester may also be selected, and where an alcohol byproduct is generated.

Polycondensation catalyst examples for either the crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

In embodiments, the hydroxyl end groups of the polyester resin may be modified to acid moieties by mild oxidation with an aqueous hypohalite, such as aqueous sodium hypochlorite bleach. The hypochlorite may be added to a bromide ion source in this reaction. A phase-transfer catalyst (PTC) is utilized in this reaction as a "shuttle" between the aqueous and organic phase. That is, the PTC extracts the hypochlorite anion from the aqueous phase and transports it into the organic reaction phase where the anion can then react with the dissolved polyester resin.

Suitable bleaches for use herein include for example solid alkali metal hypochlorite or alkaline earth metal hypochlorite, sodium hypochlorite, potassium hypochlorite, magnesium hypochlorite, lithium hypochlorite, calcium hypochlorite and combinations thereof. If alkali metal hypochlorite or alkaline earth metal hypochlorites are used herein, the alkali or alkaline earth metal hypochlorites include, for example, sodium hypochlorite, potassium hypochlorite, magnesium hypochlorite, lithium hypochlorite, and calcium hypochlorite. The amount of hypochlorite used will vary depending upon which hypochlorite is used.

In embodiments, the alkali or alkaline earth metal hypochlorite is sodium hypochlorite, the bromide ion source is sodium bromide and the alkali or alkaline earth metal hypobromite is sodium hypobromite. Other suitable bromide ion sources may include, for example, sodium bromide, potassium bromide, lithium bromide, and hydrobromic acid.

In embodiments, the sodium hypochlorite bleach acts as an oxidant. The organic phase may be, for example, ethyl acetate, which is less toxic and less expensive than dichloromethane. The PTC catalyst may be, for example, tetrabutylammonium hydrogen sulfate and the like. The PTC utilizes catalytic amounts of lipophilic or organic soluble quaternary ammonium salts for the transfer of anionic species from aqueous to organic media. The reaction requires contacting a water-immiscible, liquid organic phase comprising the polyester resin and a water-immiscible, organic solvent with an aqueous phase that contains the hypohalite ion, and a catalytic amount of a quaternary ammonium salt and/or a quaternary phosphonium salt.

In embodiments, a hydrogen peroxide, oxygen, and manganese tetraoxide may be used instead of the chlorite.

Suitable organic solvents include, for example, any organic solvent known to solubilize quaternary ammonium salts, including, primary alkyl esters, such as ethyl acetate. Other suitable organic solvents include, for example, dipolar, aprotic solvents such as acetone, chloroform, methylene chloride, dimethylformamide, dimethyl sulfoxide, terephthaloyl chloride and an isophthaloyl chloride or mixtures thereof.

Examples of other solvents that may be used herein include, for example, alcohol solvent such as methanol, ethanol, n-propyl alcohol, isopropyl alcohol, tertiary butyl alcohol, secondary alcohol with branch and dihydroterpineol; paraffinic solvent such as $C_5$-$C_{18}$ straight chain alkane, branched chain alkane, and cycloalkane; aromatic solvent such as benzene, toluene, ethyl benzene, xylene, trimethyl benzene and other monosubstituted or polysubstituted alkyl benzene; ester solvent such as esters of aliphatic acids, esters of aromatic acids, and trimethyl phosphate, triethyl phosphate, tripropyl phosphate, tributyl phosphate, trioctyl phosphate and other trialkyl phosphate; ether solvent such as alkyl ethers, aryl ethers or aryl alkyl ethers; ketone solvent such as dialkyl ketones, aryl alkyl ketones; nitrile solvent such as acetonitrile and benzyl nitrile; and halogenated hydrocarbon solvent such as halogenated alkanes and halogenated aromatic hydrocarbons; and combinations thereof and the like.

Suitable phase transfer catalysts include, for example, quaternary ammonium compounds including tetrabutylammonium bromide, tetrabutylammonium chloride, tetrabutylammonium fluoride trihydrate, tetrabutylammonium hydrogen sulfate, tetrabutylammonium iodide, tetrabutylammonium thiocyanate, tetrabutylammonium tetrafluoroborate, benzyltributylammonium chloride, benzyltriethylammonium chloride, benzyltrimethylammonium bromide, benzyltrimethylammonium chloride, hexadecyltrimethylammonium bromide, hexadecyltrimethylammonium chloride, hexadecyltrimethylammonium hydrogen sulfate, methyltrioctadecylammonium bromide, methyltrioctylammonium bromide, methyltrioctylammonium chloride, tetraethylammonium bromide, tetraethylammonium chloride, tetraethylammonium fluoride dehydrate, tetraethylammonium hexafluorophosphate, tetraethylammonium tetrafluoroborate, tetrahexylammonium hydrogen sulfate, tetramethylammonium bromide, tetramethylammonium chloride, tetraoctylammonium bromide and tetraoctylammonium chloride; quaternary phosphonium compounds including tributylhexadecylphosphonium bromide, tetrabutylphosphonium chloride and tetrabutylphosphonium bromide; and complexants including polyethers of complex structure, crown ether types and polyethylene glycols (PEG) such as 12-crown-4,1-aza-15-crown-5,15-crown-5, dibenzo-18-crown-6, dibenzo-24-crown-8, 18-crown-6, dicyclohexano-18-crown-6, dicyclohexano-24-crown-8, tris[2-(2 methoxyethoxy)ethyl]amine, 4,7,13,16,21,24-hexaoxa-1,10-diazabicyclo[8.8.8]hexacosane, polyethylene glycol 200, polyethylene glycol 400, polyethylene glycol 600 and polyethylene glycol 1000.

The following equation is an example of a Phase Transfer Catalyzed Reaction:

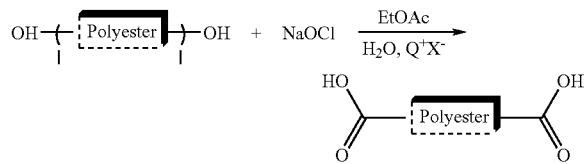

The PTC extracts the anion from the aqueous phase and transfers the anion into the organic reaction phase where the anion may freely react with the organic reactant that resides in the organic phase. The PTC may be, for example, a quaternary ammonium salt ($Q^+$) and the anion to be reacted is abbreviated $X^-$.

In embodiments, polyester hydroxyl end groups are converted to carboxylic acid end groups by dissolving the polyester resin in the ethyl acetate with the catalyst and adding the aqueous hypochlorite solution. The reaction readily occurs at room temperature with vigorous stirring in less than an hour.

After conversion of the hydroxyl end groups to carboxylic acid end groups, the resin may be washed by extraction in its organic phase, homogenized with deionized water and optional surfactant and dispersed as 150-250 nm aqueous emulsion particles after distilling off the organic phase. These particles may then be utilized in the aggregation and coalescence process to make polyester EA toner.

In embodiments, the polyester resin has an amount of carboxylic acid groups at the end of the polyester chains such that the resin has an acid value of, for example, from about 1 to 50 mg/eq. KOH, such as from about 1 to about 25 mg/eq. KOH and about 10 to about 25 mg/eq.

Acid number represents the milligrams of potassium or sodium hydroxide required to neutralize the acidic constituents present in a 1 gram sample of the material. The material may be dissolved in an appropriate solvent, for example such as toluene and/or isopropanol, and titrated with the hydroxide.

The acid value (AV) number relates to the ability of a polyester resin to be emulsified in water without surfactant. It is desirable to use little or no surfactant to reduce the number of washes necessary in the EA process. The higher the AV, the easier the polyester resin may be emulsified in water without surfactant.

The AV is a measurement of all of the bound acid groups. As such, all of the acid groups endcapping the polyester resin react to become bound and not free. As a result, the AV of the end toner is substantially the same as the AV of the polyester resin. Substantially the same as here refers to, for example, AV values with in about 1 of each other. Since the end groups are substantially all reacted, the AV in the polyester is not due to any strong unreacted acid that may be washed out of the toner to result in lower AV in the toner. The AV of the toner is thus substantially the same as the AV of the polyester resin.

It is desirable to have a toner with low sulfonation and high acid moieties since sulfonation can decrease charge when it flows to the surface of the toner during coalescence. Toners with higher acid value tend to have higher charge due to the distribution of carboxylic groups on the surface of the toner.

The toner particles may be prepared by a variety of known methods. Although embodiments relating to toner particle production are described below with respect to emulsion-aggregation processes, any suitable method of preparing toner particles may be used, including chemical processes, such as the suspension and encapsulation processes disclosed in U.S. Pat. Nos. 5,290,654 and 5,302,486, the disclosures of which are incorporated herein in their entirety. In embodiments, toner compositions and toner particles are prepared by well-known aggregation and coalescence processes in which small-size resin particles are aggregated to the appropriate toner particle size and then coalesced to achieve the final toner-particle shape and morphology.

In embodiments, toner compositions may be prepared by emulsion-aggregation processes, such as a process that includes aggregating particles from a mixture of a colorant, an optional wax and any other desired or required additives, and emulsions comprising the binder resins, and then coalescing the aggregated particles. The resin emulsion may be prepared by dissolving resin in a suitable solvent, optionally using surfactants. Polyester emulsions, including any emulsions that contain crystalline polyester resin and/or amorphous acidic polyester resin, may be similarly prepared.

Suitable solvents include alcohols, ketones, esters, ethers, chlorinated solvents, nitrogen containing solvents and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. Particular solvents that can be used include acetone, methyl ethyl ketone, cyclohexanone, methyl acetate, ethyl acetate, dimethylsulfoxide, and mixtures thereof.

If desired or necessary, the resin can be dissolved in the solvent at elevated temperature, such as about 40 to about 80° C. or about 50 to about 70° or about 60 to about 65° C., although the temperature is desirable lower than the glass transition temperature of any wax and the resin(s). In embodiments, the resin is dissolved in the solvent at elevated temperature, but below the boiling point of the solvent, such as at about 2 to about 15° C. or about 5 to about 10° C. below the boiling point of the solvent.

The resin is dissolved in the solvent, and is mixed into an emulsion medium, for example water such as deionized water containing a stabilizer, and optionally a surfactant.

Suitable stabilizers include, for example, water-soluble alkali metal hydroxides, such as sodium hydroxide, potassium hydroxide, lithium hydroxide, beryllium hydroxide, magnesium hydroxide, calcium hydroxide, or barium hydroxide; ammonium hydroxide; alkali metal carbonates, such as sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. In embodiments, a particularly desirable stabilizer is sodium bicarbonate or ammonium hydroxide.

When a stabilizer is used in the composition, it is typically present in amounts of from about 0.1 to about 5%, such as about 0.5 to about 3%, by weight of any wax and the resin(s). When such salts are added to the composition as a stabilizer, it is desired in embodiments that incompatible metal salts are not present in the composition. For example, when these salts are used, the composition should be completely or essentially free of zinc and other incompatible metal ions, e.g., Ca, Fe, Ba, etc. that form water-insoluble salts. The term "essentially free" refers, for example, to the incompatible metal ions as present at a level of less than about 0.01%, such as less than about 0.005% or less than about 0.001%, by weight of the wax and resin. If desired or necessary, the stabilizer can be added to the mixture at ambient temperature, or it can be heated to the mixture temperature prior to addition.

Optionally, it may be desirable to add an additional stabilizer such as a surfactant to the aqueous emulsion medium such as to afford additional stabilization to the resin. Suitable surfactants include anionic, cationic and nonionic surfactants. In embodiments, the use of anionic and nonionic surfactants can additionally help stabilize the aggregation process in the presence of the coagulant, which otherwise could lead to aggregation instability.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. An example of a suitable anionic surfactant is NEOGEN R-K available from Daiichi Kogyo Seiyaku Co. Ltd. (Japan), or TAYCAPOWER BN2060 from Tayca Corporation (Japan), which consists primarily of branched sodium dodecyl benzene sulfonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. An example of a suitable cationic surfactant is SANISOL B-50 available from Kao Corporation, which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonyiphenyl ether, dialkylphenoxy poly(ethyleneoxy)ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a suitable nonionic surfactant is ANTAROX 897 available from Rhone-Poulenc Inc., which consists primarily of alkyl phenol ethoxylate.

After the stabilizer or stabilizers are added, the resultant mixture can be mixed or homogenized for any desired time.

Next, the mixture may be heated to flash off the solvent, and then cooled to room temperature. For example, the solvent flashing can be conducted at any suitable temperature above the boiling point of the solvent in water that will flash off the solvent, such as about 60 to about 100° C., for example about 70 to about 90° C. or about 80° C., although the temperature may be adjusted based on, for example, the particular wax, resin, and solvent used.

Following a solvent flash step, the polyester resin emulsion, in embodiments have an average particle diameter in the range of about 100 to about 500 nanometers, such as from about 130 to about 300 nanometers as measured with a Honeywell MICROTRAC® UPA150 particle size analyzer.

A pre-toner mixture is prepared by combining the colorant, and optionally a wax or other materials, surfactant, and crystalline and/or amorphous acidic polyester emulsions, which may be two or more emulsions that contain either the crystalline polyester resin and/or the amorphous acidic polyester resin. In embodiments, the pH of the pre-toner mixture is adjusted to between about 2.5 to about 4. The pH of the pre-toner mixture may be adjusted by an acid such as, for example, acetic acid, nitric acid or the like. Additionally, in embodiments, the pre-toner mixture optionally may be homogenized. If the pre-toner mixture is homogenized, homogenization may be accomplished by mixing at about 600 to about 4,000 revolutions per minute. Homogenization may be accomplished by any suitable means, including, for example, an IKA ULTRA TURRAX T50 probe homogenizer.

Following the preparation of the pre-toner mixture, an aggregate mixture is formed by adding an aggregating agent (coagulant) to the pre-toner mixture. The aggregating agent is generally an aqueous solution of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof.

In embodiments, the aggregating agent may be added to the pre-toner mixture at a temperature that is below the glass transition temperature ($T_g$) of the emulsion resin. In some embodiments, the aggregating agent may be added in an amount of about 0.05 to about 3.0 pph and from about 1.0 to about 10 pph with respect to the weight of toner. The aggregating agent may be added to the pre-toner mixture over a period of from about 0 to about 60 minutes. Aggregation may be accomplished with or without maintaining homogenization. Aggregation is accomplished at temperatures that are preferably greater then 60° C.

In embodiments, although either a multivalent salt, such as polyaluminum chloride, or a divalent salt, such as zinc acetate, may be used, and the toner formulations may be identical for both aggregating agents, the process of preparing the toner particles is different. A divalent cation material is used in embodiments in which the binder includes both linear amorphous and crystalline polyesters. In the case of the multivalent salt, anion and nonionic surfactants can be added to the latex mixture to stabilize the particle and reduce the shocking when a multivalent aggregating agent like PAC is added. PAC is also required to be added at room temperature (cold addition) to initiate aggregation in the presence of the pigment, since the addition of PAC at elevated temperature is typically not effective. In embodiments in which divalent salts are used as aggregating agents, the agent may be added at elevated temperature, for example about 50 to 60° C. (hot addition) as opposed to cold addition. The primary reason for this is that zinc acetate dissociates itself into the aqueous phase and the particle (pKa of zinc acetate is about 4.6). The dissociation is temperature dependent as well as pH dependent. When zinc acetate is added at elevated temperature, the temperature factor is minimized or eliminated. The amount of zinc acetate added can controlled to control the particle size, while in the case of cold addition of zinc acetate, neither of these parameters can be controlled.

Thus, the process calls for blending the crystalline polyester resin and the linear and/or branched amorphous polyester resin emulsions, together in the presence of a pigment and optionally a wax or other additives, all comprising submicron particles, heating the blend from room temperature to about 60° C., followed by addition of addition of zinc acetate solution. The temperature may be slowly raised to 65° C. and held there for about 6 hours to provide 9 micron particles that have a shape factor of, for example, about 115 to about 130 as measured on the FPIA SYSMEX analyzer.

When a multivalent ion like PAC is used as the aggregating agent, it must be added cold as discussed above. Thus, the process steps are different than with zinc acetate, and calls for the addition of surfactants to the latex blend, followed by the addition of the pigment and optional additives. The surfactant stabilizes the particles by either electrostatic or steric forces or both, to prevent massive flocculation, when the aggregating agent is added. The pH of the blend containing, for example, the blend of toners, pigment, optional additives (wax) is adjusted from about 5.6 to about 3.0 with 0.1 M nitric acid, followed by the addition of PAC, while being polytroned at speeds of about 5000 rpm. The temperature of the mixture is raised from room temperature to 55° C., and slowly in stages to about 70° C. in order to coalesce the particles. No pH adjustment is required to stabilize the particle size in either of the two aggregating agent processes.

Following aggregation, the aggregates are coalesced. Coalescence may be accomplished by heating the aggregate mixture to a temperature that is about 5 to about 20° C. above the $T_g$ of the emulsion resin. Generally, the aggregated mixture is heated to a temperature of about 50 to about 80° C. In embodiments, the mixture may also be stirred at from about 200 to about 750 revolutions per minute to coalesce the particles. Coalescence may be accomplished over a period of from about 3 to about 9 hours.

Optionally, during coalescence, the particle size of the toner particles may be controlled and adjusted to a desired size by adjusting the pH of the mixture. Generally, to control the particle size, the pH of the mixture is adjusted to between about 5 to about 7 using a base such as, for example, sodium hydroxide.

After coalescence, the mixture may be cooled to room temperature. After cooling, the mixture of toner particles of some embodiments may be washed with water and then dried. Drying may be accomplished by any suitable method for drying including freeze drying. Freeze drying is typically accomplished at temperatures of about −80° C. for a period of about 72 hours.

Upon aggregation and coalescence, the toner particles of embodiments have an average particle size of from about 3 to about 25 microns, in further embodiments of from about 3 to about 15 microns, and, in particular embodiments, of from about 4 to about 12 microns, such as about 7 microns. The geometric size distribution (GSD) of the toner particles of embodiments may be in a range of from about 1.20 to about 1.35, and in particular embodiments of less than about 1.25. The volume average and number average geometric size distribution (GSDv and GSDn) of the toner particles of embodiments may be in a range of from about 1.1 to about 1.3, as measured with a suitable process such as Coulter Counter Multisizer II. The volume average and the number average distribution, respectively, are determined based on the particle diameters at which a cumulative percentage of particles are attained. In this regard, the particle diameters at which a cumulative percentage of 16 percent are attained are defined as volume D16 percent and number D16 percent, respectively, and the particle diameters at which a cumulative percentage of 84 percent are attained are defined as volume D84 percent and number D84 percent, respectively. These aforementioned volume average particle size distribution index GSDv and number average particle size distribution index GSDn can be expressed by using D16 percent and D84 percent in cumulative distribution, wherein the volume average particle size distribution index GSDv is expressed as (volume D84 percent/volume D16 percent)$^{1/2}$ and the number average particle size distribution index GSDn is expressed as (number D84 percent/number D16 percent)$^{1/2}$.

In embodiments, the process may include the use of surfactants, emulsifiers, and other additives such as those discussed above. Likewise, various modifications of the above process will be apparent and are encompassed herein.

In embodiments, additives may be included in the toner compositions. Appropriate additives for inclusion in embodiments include, for example, colorants; magnetites; flocculates; curing agents; waxes; charge additives; flow-promoting agents; flow-control agents; plasticizers; stabilizers; anti-gassing and degassing agents; leveling agents; surface additives; antioxidants; UV absorbers; light stabilizers; fillers and mixtures thereof. In embodiments, additives may be incorporated into the toner particles during toner particle preparation or after cross-linking, as surface additives. Any suitable method of incorporating additives, either during toner preparation or after surface cross-linking, as surface additives, may be used.

Toner compositions of embodiments may include one or more colorant. Various known suitable colorants include dyes, pigments, mixtures thereof, such as mixtures of dyes, mixtures of pigments and mixtures of dyes and pigments, and the like. Colorants may be included in the toner in an effective amount of, for example, about 1 to about 25 weight % of the toner, and in embodiments, in an amount of about 1 to about 15 weight %.

As examples of suitable colorants, which is not intended to be an exhaustive list, mention may be made of carbon black like REGAL 330®; magnetites, such as MOBAY magnetites MO8029™, MO8060™; COLUMBIAN magnetites; MAPICO BLACKS™ and surface treated magnetites; Pfizer magnetites CB4799™, CB5300™, CB5600™, MCX6369™; Bayer magnetites, BAYFERROX 8600™, 8610™; NORTHERN PIGMENTS magnetites, NP-604™, NP-608™; MAGNOX magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like.

Generally, colorants that can be selected are black, cyan, magenta, or yellow, and mixtures thereof. Examples of magentas are 2,9-dimethyl-substituted quinacridone and anthraquinone dye identified in the Color Index as CI-60710, CI Dispersed Red 15, diazo dye identified in the Color Index as CI-26050, CI Solvent Red 19, and the like. Illustrative examples of cyans include copper tetra(octadecyl sulfonamido) phthalocyanine, x-copper phthalocyanine pigment listed in the Color Index as CI-74160, CI Pigment Blue, and Anthrathrene Blue, identified in the Color Index as CI-69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as FORON Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants.

Other known colorants can be selected, such as LEVANYL Black A-SF (Miles, Bayer) and SUNSPERSE Carbon Black LHD 9303 (Sun Chemicals), and colored dyes such as NEOPEN Blue (BASF), SUDAN Blue OS (BASF), PV Fast Blue B2G01 (American Hoechst), SUNSPERSE Blue BHD 6000 (Sun Chemicals), IRGALITE Blue BCA (Ciba-Geigy), PALIOGEN Blue 6470 (BASF), SUDAN III (Matheson, Coleman, Bell), SUDAN II (Matheson, Coleman, Bell), SUDAN IV (Matheson, Coleman, Bell), SUDAN Orange G (Aldrich), SUDAN Orange 220 (BASF), PALIOGEN Orange 3040 (BASF), ORTHO Orange OR 2673 (Paul Uhlich), PALIOGEN Yellow 152, 1560 (BASF), LITHOL Fast Yellow 0991K (BASF), PALIOTOL Yellow 1840 (BASF), NEOPEN Yellow (BASF), Permanent Yellow YE 0305 (Paul Uhlich), LUMOGEN Yellow D0790 (BASF), SUNSPERSE Yellow YHD 6001 (Sun Chemicals), SUCO-GELB L1250 (BASF), SUCO-YELLOW D1355 (BASF), FANAL Pink D4830 (BASF), CINQUASIA Magenta (DuPont), LITHOL Scarlet D3700 (BASF), Scarlet for THERMOPLAST NSD PS PA (Ugine Kuhlmann of Canada), LITHOL Rubine Toner (Paul Uhlich), LITHOL Scarlet 4440 (BASF), Royal Brilliant Red RD-8192 (Paul Uhlich), ORACET Pink RF (Ciba-Geigy), PALIOGEN Red 3871K (BASF), PALIOGEN Red 3340 (BASF), and LITHOL Fast Scarlet L4300 (BASF).

Optionally, the toner compositions may also include a wax. When included, the wax may be present in an amount of from about, for example, 1 to about 25 weight %, and, in certain embodiments, from about 5 to about 20 weight %, of the toner. Examples of suitable waxes include, but are not limited to polypropylenes and polyethylenes commercially available from Allied Chemical and Petrolite Corporation (e.g., POLYWAX™ polyethylene waxes from Baker Petrolite); wax emulsions available from Michaelman, Inc. and the Daniels Products Company, EPOLENE N-15™ commercially available from Eastman Chemical Products, Inc., VISCOL 550-P™; low weight-average molecular-weight polypropylenes available from Sanyo Kasei K. K., CARNUABA Wax and similar materials. Examples of functionalized waxes include, for example, amines; amides, for example AQUA SUPERSLIP 6550™, SUPERSLIP 6530™ available from Micro Powder Inc.; fluorinated waxes, for example POLYFLUO 190™, POLYFLUO 200™, POLYSILK 19™, POLYSILK 14™ available from Micro Powder Inc.; mixed fluorinated amide waxes, for example MICROSPERSION 19™ also available from Micro Powder Inc.; imides; esters; quaternary amines; carboxylic acids or acrylic polymer emulsions, for example JONCRYL 74™, 89™, 130™, 537™, and 538™, all available from SC Johnson Wax; and chlorinated polypropylenes and polyethylenes available from Allied Chemical and Petrolite Corporation and SC Johnson Wax.

The toners of embodiments may also contain other optional additives, as desired or required. For example, the toner may include positive or negative charge enhancing additives, in embodiments in amounts of from about 0.1 to about 10 weight %, or from about 1 to about 3 weight %, of the toner. Examples of these additives include quaternary ammonium compounds inclusive of alkyl pyridinium halides; alkyl pyridinium compounds such as those described in U.S. Pat. No. 4,298,672, the disclosure of which is incorporated herein by reference; organic sulfate and sulfonate compositions such as those described in U.S. Pat. No. 4,338,390, the disclosure of which is incorporated herein by reference; cetyl pyridinium tetrafluoroborates; distearyl dimethyl ammonium methyl sulfate; aluminum salts such as BONTRON E84™ or E88™ (available from Hodogaya Chemical); and the like.

There can also be blended with the toner compositions external additive particles including flow aid additives, which additives may be present on the surface of the toner particles. Examples of these additives include metal oxides like titanium oxide, tin oxide, mixtures thereof, and the like; colloidal silicas, such as AEROSIL®, metal salts and metal salts of fatty acids, including zinc stearate, aluminum oxides, cerium oxides, and mixtures thereof. Each of the external additives may be present in embodiments in amounts of from about 0.1 to about 5 weight %, or from about 0.1 to about 1 weight %, of the toner.

The present toners are sufficient for use in an electrostatographic or xerographic process. The present toners generally exhibit a minimum fixing temperature of from about 80 to about 130° C. The present toners exhibit satisfactory properties when used in a xerographic or electrostatographic process. Such properties include a high gloss, which may be in the range of from about 20 to about 60 Garner gloss units (ggu); good charging in high temperature/high- and low-humidity environments; a fusing latitude of 100° C. or more; and substantially no vinyl offset.

The toner particles according to embodiments display non-additive heat cohesions of less than about 50%, and in specific embodiments, of less than about 20%, such as less than about 10% or less than about 5%.

The toner particles of all embodiments may be included in developer compositions. In embodiments, developer compositions comprise toner particles, such as those described above, mixed with carrier particles to form a two-component developer composition. In some embodiments, the toner concentration in the developer composition may range from about 1 to about 25 weight %, or from about 2 to about 15 weight %, of the total weight of the developer composition.

Illustrative examples of carrier particles that can be selected for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like.

The selected carrier particles can be used with or without a coating, the coating generally being comprised of fluoropolymers, such as polyvinylidene fluoride resins; terpolymers of styrene; methyl methacrylate; silanes, such as triethoxy silane; tetrafluoroethylenes; other known coatings; and the like.

In applications in which the described toners are used with an image-developing device employing roll fusing, the carrier core may be at least partially coated with a polymethyl methacrylate (PMMA) polymer having a weight-average molecular weight of 300,000 to 350,000, e.g., such as commercially available from Soken. PMMA is an electropositive polymer that will generally impart a negative charge on the toner by contact. The coating has, in embodiments, a coating weight of from, for example, 0.1 to 5.0 weight %, or 0.5 to 2.0 weight % of the carrier. PMMA may optionally be copolymerized with any desired comonomer, so long as the resulting copolymer retains a suitable particle size. Suitable comonomers can include monoalkyl, or dialkyl amines, such as dimethylaminoethyl methacrylates, diethyl-aminoethyl methacrylates, diisopropylaminoethyl methacrylates, tert-butylaminoethyl methacrylates, and the like, and mixtures thereof. The carrier particles may be prepared by mixing the carrier core with from, for example, between about 0.05 to about 10 weight % of polymer, and in embodiments, between about 0.05 and about 3 weight % of polymer, based on the weight of the coated carrier particles, until the polymer coating adheres to the carrier core by mechanical impaction and/or electrostatic attraction. Various effective suitable means can be used to apply the polymer to the surface of the carrier core particles, e.g., cascade-roll mixing, tumbling, milling, shaking, electrostatic powder-cloud spraying, fluidized bed, electrostatic disc processing, and with an electrostatic curtain. The mixture of carrier core particles and polymer is then heated to melt and fuse the polymer to the carrier core particles. The coated carrier particles are then cooled and classified to a desired particle size.

Carrier particles can be mixed with toner particles in any suitable combination in embodiments. In some embodiments, for example, about 1 to about 5 parts by weight of toner particles are mixed with from about 10 to about 300 parts by weight of the carrier particles.

After mixing toner particles with one or more carrier particles to form developers, a number of toner properties may be measured, these properties may include, for example, toner triboelectric charge. Other properties of the toner, such as the toner cohesion, are measured before mixing the toner and carrier into the developer. The aforementioned properties may affect the performance of the developers, such as image quality degradation over time.

Toner cohesion may be measured using a Hosokawa Micron PT-R tester, available from Micron Powders Systems. Toner cohesion is typically expressed in percent (%) cohesion. Percent cohesion may be measured by placing a known mass of toner, typically 2 grams, on top of a set of stacked screens, for example a top screen that has 53 micron mesh or openings, a middle screen that has 45 micron mesh or openings, and a bottom screen that has 38 micron mesh or openings, and vibrating the screens and toner for a fixed time at a fixed vibration amplitude, for example for 90 seconds at 1 millimeter vibration amplitude. All screens are desirably made of stainless steel. In embodiments, the percent cohesion is calculated as follows:

$$\% \text{ cohesion} = 50 \cdot A + 30 \cdot B + 10 \cdot C$$

where A is the mass of toner remaining on the 53 micron screen, B is the mass of toner remaining on the 45 micron screen, and C is the mass of toner remaining on the 38 micron screen. The percent cohesion of the toner is related to the amount of toner remaining on each of the screens at the end of the time. A percent cohesion value of 100% corresponds to all the toner remaining on the top screen at the end of the vibration step (50×2 grams=100) and a percent cohesion of 0% corresponds to all of the toner passing through all three screens, in other words, no toner remaining on any of the three screens at the end of the vibration step. The greater the percent cohesion for toners, the less the toner particles are able to flow. In embodiments, the toners may have a percent cohesion in the range of, for example, from about 1% to about 80%, such as from about 1% to about 40% and from about 1% to about 10%.

In embodiments, any known type of image development system may be used in an image developing device, including, for example, magnetic brush development, jumping single-component development, hybrid scavengeless development (HSD), etc. These development systems are well known in the art, and further explanation of the operation of these devices to form an image is thus not necessary herein. Once the image is formed with toners/developers of the invention via a suitable image development method such as any one of the aforementioned methods, the image is then transferred to an image receiving medium such as paper and the like. In an embodiment of the present invention, it is desired that the toners be used in developing an image in an image-developing device utilizing a fuser roll member. Fuser roll members are contact fusing devices that are well known in the art, in which heat and pressure from the roll are used in order to fuse the toner to the image-receiving medium. Typically, the fuser member may be heated to a temperature just above the fusing temperature of the toner, i.e., to temperatures of from about 80° C. to about 150° C. or more.

EXAMPLES

Oxidation Example

In a 500 ml Erlenmeyer flask, 20 g of branched polyester resin was dissolved in 280 g ethyl acetate and heated to 60° C. to dissolve. To the dissolved resin, 1.9 g of tetrabutylammonium hydrogen sulfate was added, followed by 100 g of reagent grade sodium hypochlorite solution (10-13% chloride). The flask was covered with foil and stirred vigorously at 1100 rpm on a magnetic stir plate at approximately 23° C. (ambient temperature) for 60 minutes. The reacted solution was transferred to a 500 ml separatory funnel and the aqueous phase (bottom layer) was removed. The dissolved resin in ethyl acetate (organic phase) was washed two times with 110 g brine solution and two more times with 60 g deionized water. The organic phase was then dried on magnesium sulfate, filtered, evaporated down via Büchi rotavapor R-124 and vacuum dried at 50° C. over night. Sample was submitted for acid value to determine level of oxidation of polyester resin.

The acid value is the number of milligrams of potassium hydroxide necessary to neutralize the free acids in 1 gram of resin. The AV number gives an indication of how easily a polyester resin can be emulsified in water without surfactant which is a desired result since less or no surfactant reduces the number of washes needed in the process. Particles with acid functionality are ionized to the sodium salt and self stabilized when prepared by the solvent flash process.

Table 1 shows oxidation reaction experiments and the results obtained from the experiments.

TABLE 1

Oxidation Experiments and Results

| Experiment # | A NaOCl | gm NaOCl | B PTC | gm PTC | C Reaction Time | Yield (g) | % Theoretical | Acid Value |
|---|---|---|---|---|---|---|---|---|
| 1 | 55% | 95.65 | 6% | 1.20 | 63 min | 13.62 | 68.1% | 11.03 |
| 2 | 55% | 95.65 | 6% | 1.37 | 120 min | 17.46 | 87.3% | 24.12 |
| 3 | 55% | 95.65 | 12% | 2.40 | 66 min | 19.97 | 99.9% | 16.95 |
| 4 | 55% | 101.62 | 12% | 2.40 | 120 min | 11.13 | 55.7% | 22.31 |
| 5 | 65% | 113.04 | 6% | 1.20 | 60 min | 19.30 | 96.5% | 8.67 |
| 6 | 65% | 113.04 | 6% | 1.20 | 120 min | 18.21 | 91.1% | 29.77 |
| 7 | 65% | 113.04 | 12% | 2.40 | 60 min | 17.62 | 88.1% | 9.28 |
| 8 | 65% | 113.04 | 12% | 2.40 | 120 min | 17.50 | 87.5% | 16.7 |
| 9 | 55% | 95.65 | 6% | 1.20 | 120 min | 10.54 | 52.7% | 12.37 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. Unless specifically recited in a claim, steps or components of claims should not be implied or imported from the specification or any other claims as to any particular order, number, position, size, shape, angle, color or material.

What is claimed is:

1. A process of oxidizing a polyester resin, comprising oxidizing a polyester resin by reacting the polyester in an organic phase with a hypohalite in an aqueous phase, using a phase transfer catalyst, resulting in a polyester resin containing chains endcapped with at least one acidic group.

2. The process according to claim 1, wherein the at least one acidic group is a carboxylic acid group.

3. The process according to claim 1, wherein the phase transfer catalyst is in the aqueous phase.

4. The process according to claim 1, wherein the polyester resin is amorphous, crystalline, semi-crystalline or a mixture thereof.

5. The process according to claim 1, wherein the organic phase is a primary alkyl ester.

6. The process according to claim 5, wherein the primary alkyl ester is an ethyl acetate.

7. The process according to claim 1, wherein the phase transfer catalyst is a quaternary ammonium salt.

8. The process according to claim 7, wherein the quaternary ammonium salt is a tetrabutyl ammonium.

9. The process according to claim 1, wherein the phase transfer catalyst is a quaternary phosphonium salt.

10. The process according to claim 7, wherein the quaternary ammonium salt is a tetrabutyl ammonium hydrogen sulfate or tetrabutyl ammonium chloride.

11. The process according to claim 1, wherein the polyester resin has an acid value of from about 1 to about 50 mg/eq. KOH.

12. The process according to claim 1, wherein the polyester resin has an acid value of from about 10 to about 25 mg/eq. KOH.

13. The process according to claim 1, wherein the hypohalite is a hypochlorite.

14. The process according to claim 1, wherein the hypohalite is selected from the group consisting of sodium hypochlorite, potassium hypochlorite, magnesium hypochlorite, lithium hypochlorite, calcium hypochlorite and combinations thereof.

15. The process according to claim 1, wherein the organic phase is ethyl acetate.

\* \* \* \* \*